United States Patent [19]

Larsen

[11] Patent Number: 5,502,179
[45] Date of Patent: Mar. 26, 1996

[54] CARRAGEENAN PRODUCT AND A METHOD OF PRODUCING SAME

[75] Inventor: Peter F. Larsen, Højbjerg, Denmark

[73] Assignee: Grinsted Products A/S (Danisco A/S, Copenhagen, Denmark

[21] Appl. No.: 211,927

[22] PCT Filed: Mar. 28, 1994

[86] PCT No.: PCT/DK94/00131

§ 371 Date: Jul. 12, 1994

§ 102(e) Date: Jul. 12, 1994

[87] PCT Pub. No.: WO92/19192

PCT Pub. Date: Nov. 12, 1992

[51] Int. Cl.$^6$ .............................. C07G 17/00; C07H 1/06
[52] U.S. Cl. .................. 536/114; 536/123; 536/128
[58] Field of Search ........................... 536/114, 123, 536/128

[56] References Cited

U.S. PATENT DOCUMENTS

| | | | |
|---|---|---|---|
| 2,620,334 | 12/1952 | Nielsen et al. | 536/122 |
| 2,620,335 | 12/1952 | Nielsen et al. | 536/122 |
| 3,094,517 | 6/1963 | Stanley | 536/122 |
| 3,280,102 | 10/1966 | Gordon et al. | 536/114 |
| 3,342,612 | 9/1967 | Foster et al. | 426/575 |
| 3,382,286 | 5/1968 | Griffin et al. | 568/812 |
| 3,879,890 | 4/1975 | Chen et al. | 47/1.4 |
| 3,907,770 | 9/1975 | Strong | 536/114 |
| 4,443,386 | 4/1984 | Wrightson | 261/29 |
| 4,443,486 | 4/1984 | Guisley | 426/584 |
| 4,950,752 | 8/1990 | Whitaker | 536/128 |

FOREIGN PATENT DOCUMENTS

| | | | |
|---|---|---|---|
| 561448 | 8/1953 | Canada . | |
| 53-107990 | 9/1978 | Japan | A23K 1/18 |
| 57-19942 | 4/1982 | Japan | A23L 1/337 |
| 57-202302 | 12/1982 | Japan | C08B 37/00 |
| 756683 | 11/1989 | U.S.S.R. . | |

OTHER PUBLICATIONS

Kirk–Othmer (ed): *Encyclopedia of Chemical Technology*, 3rd edition, 1980, pp. 51–53 and pp. 64–66.
Smith et al., *Can. J. Chem.* 33, 1955, p. 1352.
International Search Report, International Patent Application No. PCT/DK93/00127 (Nov. 18, 1993).
"The Merck Index"; 11th Ed. (1989) [1872. Carrageenan, pp. 284–285].
R. L. Whistler (ed.) "Industrial Gums", Academic Press, NY, 2nd ed., pp. 83–115 (1973).
E. Soler y Ordoñez (ed.), "Medicamenta", vol. 2, Edit. Labor Barcelona, pp. 383–384, with translation.
Kirk & Othmer, "Encyclopedia of Chemical Technology", J. Wiley & Sons (1980).
"Expert Report on Invention Patent Application", Chile Patent Application No. 887–91.

*Primary Examiner*—John W. Rollins
*Attorney, Agent, or Firm*—Fish & Richardson

[57] ABSTRACT

A carrageenan product which is useful as an emulsifyer and for thickening or gelling aqueous systems is made by subjecting a carrageenan-containing material in which 6-sulphated galactose units have been converted into 3,6-anhydro galactose units to a shear stress treatment, e.g., by means of an extruder. The starting seaweed material, typically originating from Gigartinaceae and Solieriaceae, has been subjected to a treatment in a substantially homogeneous mixture of a solvent in which carrageenan is substantially insoluble, and a basic aqueous phase. The base-treated carrageenan-containing product is also useful per se. The shear stress treated carrageenan product shows a maximum swelling temperature of at the most 85° C. and exhibits a light transmission of at least 5% and has a cellulose content of at least 0.5% by weight.

34 Claims, 2 Drawing Sheets

CARRAGEENAN PRODUCT AND A METHOD OF PRODUCING SAME

FIELD OF THE INVENTION

The present invention relates to a method for the production of a carrageenan product derived from seaweed and to a carrageenan product prepared by the method.

BACKGROUND OF THE INVENTION

Carrageenan is a complex mixture of sulphated polysaccharides comprising linear polymers of 1,3 bound α-D-galactose units and 1,4 bound α-D-galactose units with the following generalised structure:

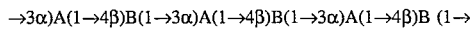

in which A and B represent galactose derivatives from two different groups. The molecular weight of useful commercial carrageenan is generally from about 500,000 to about 1,000,000. Polymers with a molecular weight below about 100,000 are not generally classified as carrageenan. Carrageenan is used extensively in the food industry as an emulsifier, a gelling agent and a thickening agent.

Carrageenan is normally soluble in warm water, in which it forms high viscosity solutions, and insoluble in most organic solvents. All types of carrageenans form complexes with proteins.

Various types of carrageenan designated as kappa, iota, lambda, ny and my carrageenan are known. The different types are differentiated according to the nature of their repeating galactose units. The most important carrageenan types for commercial purposes are kappa, iota and lambda carrageenan (Kirk-Othmer (ed): *Encyclopedia of Chemical Technology*, 3rd edition, 1980, p. 53).

Portions of the polymer chains in some types of carrageenan (kappa/iota) can form double helix structures and thus a 3-dimensional network which results in gel formation. Carrageenan gels are thermoreversible. The temperature at which the transition from gel to sol occurs (the gel's melting point) is between 40° C. and 70° C., depending upon the concentration and presence of cations.

In aqueous solution, the various types of carrageenan react differently towards different cations as follows:

kappa carrageenan: precipitates (gels) with $K^+$, $Ca^{++}$, $Mg^{++}$, $Ba^{++}$, $Sr^{++}$ and $NH_4^+$, and is insoluble in solutions containing these ions. The strongest gelation is achieved with $K^+$. No gelation occurs with $Na^+$, and Na salts are soluble.

lambda carrageenan: does not precipitate (gel) with the cations listed above. All salts are soluble.

iota carrageenan: essentially like kappa carrageenan, but the strongest gelation is achieved with $Ca^{++}$.

These properties can be employed for selective extraction of kappa/iota and lambda carrageenan (see, e.g., Smith et al., *Can. J. Chem.* 33, 1352 (1955)).

Carrageenan contains galactose units which are sulphated in the 6-position. These can be converted into 3,6-anhydro galactose units (elimination of sulphate by ring formation) by treatment with a base. The resulting carrageenan product containing 3,6-anhydro galactose units shows improved gel properties.

The polymer chains in carrageenan can be broken by treatment with an acid (hydrolytic depolymerization) or by treatment with hydrogen peroxide (oxidative depolymerization). By the above-mentioned base treatment and a hydrolytic or oxidative depolymerization, carrageenan products having optimum gelling properties and viscosity for specific purposes may be obtained.

Carrageenan is found in seaweed of the class Rhodophyceae (red algae) from which it can be isolated. Carrageenan does not exist as a free polymer in the red algae, but constitutes a part of the "skeleton" of the algae.

The occurrence and distribution of the various carrageenan types in Rhodophyceae is dependent on, among other things, the species, location and life cycle of the seaweed. Carrageenan is found in species belonging to the families Gigartinaceae and Solieriaceae and particularly in the species belonging to the genera Gigartina, Chondrus, Eucheuma and Iridaea.

Red algae of the family Gigartinaceae, e.g., *Chondrus crispus* and *Gigartina stellata*, synthesize kappa and lambda carrageenan in different growth stages: kappa carrageenan in the male and female stage and lambda carrageenan in the asexual growth stage. The lambda/kappa ratio in isolated carrageenan from a species of algae is thus effected by the relative dominance of one or the other growth stage at the time the algae is "harvested" as well as by the location at which the algae grows. By use of vegetative propagation of algae from a given growth stage it is possible to obtain an algal material which is consistent with regard to content and distribution of carrageenan. Algae isolated from a given growth stage can be propagated vegetatively, thus maintaining this stage, thereby making it possible to obtain an algal material with a desired content of a given carrageenan type.

Red algae from the family Solieriaceae, e.g., *Eucheuma cottonii* and *Eucheuma spinosum*, synthesize essentially kappa and iota carrageenan, respectively.

The taxonomy of the seaweed genera and species, especially the genera Gigartina and Iridaea, is a matter of discussion. The *Gigartina radula* species are often identified as one or more Iridaea species. Furthermore, commercial designations differing from the botanical names according to present classification are often used, which causes identification problems. In the present context, the botanical names according to present classification are used.

The traditional process for the production of commercial carrageenan products comprises extraction of carrageenan from fresh or dried seaweed in hot water at a basic pH. The aqueous extract, which contains about 1% carrageenan, is filtered to remove insoluble material (cellulose, hemicellulose, etc.). The filtered extract, which optionally can be concentrated to about 4% and subjected to various purification treatments such as filtering with activated carbon, bleaching, etc., is then treated with an alcohol or with a salt to precipitate the carrageenan. Carrageenan prepared in this manner is generally referred to as "purified carrageenan" (PC).

The production of PC requires high energy consumptions and may involve substantial environmental pollution. Therefore, several attempts have been made to provide less costly carrageenan products. Such products, which are generally referred to as "semi-refined carrageenan" (SRC), are commercially available. Specific types of SRC are also known as "KOH-treated seaweed", "alkali-treated carrageenan", "Philippine Natural Grade" (PNG), and "Processed Eucheuma Seaweed" (PES). SRC is prepared by heat-treating whole seaweed in aqueous basic solutions under conditions which modify the carrageenan into 3,6-anhydro galactose units by removing the sulphate groups.

Examples of such SRC products are disclosed in JP 57.19942, which describes a method in which algae are heat treated in an aqueous solution of potassium carbonate and sodium hydroxide, following which the algal material is washed several times with water and potassium dihydrogen phosphate solution and finally dried and crushed to give the product which may, e.g., be applied in jams and pet food; in U.S. Pat. No. 4.443.486, which discloses a carrageenan stabilizing agent for use in milkbased products, prepared by alkali treatment of seaweed of the species *Eucheuma cottonii;* and in JP 53.107990, which discloses a method in which an algal material is treated with an aqueous potassium hydroxide solution at 70°–95° C., after which the treated material is washed with water and comminuted to obtain a product which may be used as a silkworm feed.

However, the known processes for the production of SRC products involves at least the following disadvantages:

(i) the treatment in the heated basic solution may result in a certain disintegration of the seaweed structure which inevitably leads to release of carrageenan whereby the solution becomes highly viscous and the yield of carrageenan in the final products is reduced, (ii) they are not generally suitable, especially not when seaweed species having a high content of lambda carrageenan is used as the starting material, since this type of carrageenan will be dissolved in the basic solution; the use of pure sodium-containing bases will lead to loss of kappa- and iota-carrageenan, since the sodium salts hereof are soluble in water, (iii) the resulting SRC products have a limited range of applications primarily due to coloured and odorous impurities and their high content of cellulose structures and other insoluble seaweed substances giving an undesired "cloudiness" in the products in which they are used.

BRIEF DISCLOSURE OF THE INVENTION

The present invention solves the above problems and provides novel carrageenan products and methods for their production. In accordance with the invention, it has been found that by shear stress treatment of a carrageenan-containing seaweed material in which the 6-sulphated galactose units in the carrageenan have been converted into 3,6-anhydro galactose units, it is possible to obtain very valuable carrageenan products in a very economic manner. The carrageenan products obtained are substantially without off-taste, they are less coloured than known commercially available semirefined carrageenan products and, additionally, have improved swelling and hydration properties, thereby providing an economic "instantizing" carrageenan product. Furthermore, in spite of the fact that the carrageenan product is not a purified product, it may be used for the preparation of water gels with strongly improved appearance compared to semi-refined carrageenan.

The invention also relates to an advantageous method for preparing the carrageenan product which contains at least 70% by weight of carragenan in which carrageenan the 6-sulphated galactose units have been converted into 3,6-anhydro galactose units. This method comprises treating a seaweed starting material containing carrageenan in a reaction mixture comprising a substantially homogeneous basic mixture of a solvent in which carrageenan is substantially insoluble, and an aqueous phase comprising a base, to convert 6-sulphated galactose units in the carrageenan into 3,6-anhydro galactose units. In addition to being a suitable starting material of the shear stress treatment, the product obtained by this special base treatment is useful in its own right as a stabilizer and thickening and gelling agent. Compared to the known processes for preparing SRC, this method results in a higher yield of carrageenan, since substantially no loss of carrageenan occurs, irrespective of the type of carrageenan contained in the seaweed starting material.

DETAILED DISCLOSURE OF THE INVENTION

In the above-mentioned shear stress treatment method, a carrageenan product which contains at least 70% carrageenan by weight, and which is useful for thickening or gelling aqueous systems, is produced by subjecting a carrageenan-containing seaweed material in which carrageenan containing 6-sulphated galactose units have been converted into 3,6-anhydro galactose units and which has a dry matter content of at least 25% by weight and at the most 75% by weight to a shear stress treatment to obtain a product which shows a maximum swelling at a temperature of at the most 85° C. when measuring a 3% by weight suspension of the product (at a dry matter content of at least 85% by weight and an average particle size of less than 0.18 mm), in a 0.7% by weight aqueous solution of KCl by means of a Brabender Viscograph operated at 60 rpm and at a heating rate of 1.5° C./min from an initial temperature of 35° C., and which exhibits a light transmission of at least 5% when measured in the form of a water gel containing 0.126 % dry matter of the product by means of a spectrophotometer at a wavelength of 420 nm using a cuvette with a light path of 1 cm.

With respect to the swelling properties, it appears that the shear stress treatment results in a carrageenan product which is more readily hydrated and solubilized in water than the starting carrageenan-containing seaweed material. When expressed in terms of the temperature at which maximum swelling occurs using the above-defined method of measuring, this temperature is at least 4° C. lower, preferably at least 6° C. lower, such as at least 8° C lower, most preferably at least 10° C. lower and in particular at least 12° C. lower.

Both these reductions and the absolute value depend to some extent on the type of seaweed. While the maximum swelling temperature will be at the most 85° C. independently of the type of seaweed, there is a clear tendency for carrageenan products originating from seaweed of the Gigartinaceae species to have a lower maximum swelling temperature than carrageenan products originating from seaweed of the Solieriaceae species. Thus, preferred products prepared by the method of the invention may have a maximum swelling temperature of at the most 75° C., which is a typical excellent value for carrageenan derived from seaweed of the Solieriaceae, an a maximum swelling temperature of at the most 65° C., such as at the most 62° C., such as at the most 58° C., when the carrageenan product is derived from seaweed of the Gigartinaceae.

With respect to the light transmission, the value of at least 5% makes the carrageenan product useful for a number of uses for which it has hitherto been necessary to use purified carrageenan, such as fruit jellies. The light transmission will normally be at least 7%, preferably at least 10%, such as at least 12%, e.g., at least 14%, when measuring the light passage in the gel in two directions as defined above. Similar measurements on water gels prepared from non-extruded carrageenan products reveal smaller light transmission values, and these values, obtained by measuring in directions at right angles to each other, typically differ significantly from each other, which shows that the matter causing the cloudiness is unevenly distributed in the water gel.

The shear stress treatment may suitably be performed as an extrusion process or by means of a shear mixer. The shear stress treatment is typically carried out at a temperature in the range of 100° to 175° C., and preferably in the range of 110° to 150° C. These temperatures are measured where the actual shear stress treatment is carried out, e.g., in the central part of an extruder and/or near the outlet from an extruder. The shear stress treatment is normally performed for a period of time in the range of 10 to 200 seconds, preferably in the range of 10 to 100 seconds, such as in the range of 30 to 80 seconds. It will be understood that the severity or intensity of the shear stress treatment should be adapted to the particular starting material, the particular apparatus, etc., so that the above-specified product parameters are obtained.

As will appear from the examples which follow, normal commercially available extrusion equipment readily delivers a product having the above-mentioned valuable properties.

The carrageenan-containing seaweed material subjected to the shear stress treatment typically has a dry matter content of at least 30% by weight and at the most 70% by weight, such as at least 40% by weight and at the most 60% by weight.

During shear stress treatment, various substances may be added to obtain desired properties or effects. Thus, e.g., inorganic acids, bases and salts may be added to adjust the solubility of the product. In addition, functional components may be added to obtain a combination product, e.g., emulsifiers such as mono- and diglycerides, sorbitan esters, polysorbates, sucrose esters, citric acid esters of mono- and diglycerides, polyglycerol esters of fatty acids, propylene glycol monostearate, lactic acid esters, and lecithins; gelling, thickening and stabilising agents, such as non-carrageenan hydrocolloids, e.g., pectin, agar, alginate, locust bean gum, guar gum, gum arabic, and gelatine; and anti-microbial agents such as benzoic acid, parabens, sorbic acid, propionic acid, sulphur dioxide, acetic acid and formaldehyde; flavouring agents; and colouring agents.

When the shear stress treatment is performed by extrusion, the resulting carrageenan product is normally obtained in the form of strings having circular to rectangular cross sections. These strings may be cut or sliced into pieces having dimensions in the range of, e.g., 1 to 8 mm.

The carrageenan material resulting from the shear stress treatment may be dried, e.g. at a temperature in the range of 15° to 140° C. at atmospheric pressure or in vacuum, to a dry matter content of at least 80% by weight, preferably at least 85% by weight, such as 90% by weight, e.g., 95% by weight. The drying may be performed using conventional industrial drying methods such as air-drying, optionally under forced ventilation conditions.

The dried carrageenan product may optionally be subjected to comminution, grinding or milling to obtain a powder with a particle size in the range of 0.05 to 0.5 mm.

The carrageenan product obtained by the above-mentioned method has a carrageenan content of at least 75% by weight, more preferably at least 80% by weight, such as 85% by weight, calculated on dry matter basis.

The carrageenan product prepared by the above method contains relatively few impurities, e.g., starch as solid particles, cellulose and substances which might confer undesired colouring effects and undesired flavouring. The carrageenan product produced by the method of the invention is therefore fully suitable, without further purification, for use in products in which carrageenan is normally employed.

However, if desired it may also readily be subjected to further purification to produce a further purified carrageenan.

Further purification of the carrageenan product obtained by shear stress treatment may be performed by dissolving it in water, heating the solution at a temperature in the range of 70°–100° C., filtering the solution, concentrating the filtered solution, mixing the concentrated solution with a solvent to precipitate the purified carrageenan, e.g., using a solvent:solution ratio of from 1:1 to 1:3, separating the purified carrageenan from the solution, and drying the purified carrageenan.

Purification may also, e.g., be performed using potassium chloride precipitation. This typically involves spraying the carrageenan extract into a continuously flowing stream of a potassium chloride solution with a concentration of about 3.5–7% by weight. The precipitated gel is then pressed, optionally frozen and thawed, dried and finally ground.

The product prepared by the shear stress treatment method according to the invention contains substantially less non-carrageenan substances (impurities) than conventional semi-refined carrageenan products and it is substantially free from off-flavour. The product obtained in powdery form is normally cream-coloured.

As a distinction relative to non-extruded, semirefined carrageenan products, a characteristic quality of the carrageenan products prepared according to the invention is that by visual inspection, water gels prepared by cooling hot aqueous solutions of the products exhibit a faint, but homogeneous turbidity (haze), whereas non-extruded products produce water gels which appear opaque and inhomogeneous, which is caused by clouds of cotton- or woolly-like precipitations.

The starting seaweed material belongs to the class Rhodophyceae (red algae). Typically, species belonging to the families Gigartinaceae and Solieriaceae are used as starting seaweed material, in particular the species belonging to the genera Gigartina, Chondrus, Eucheuma and Iridaea.

When the carrageenan product is derived from Gigartinaceae species, it will typically have a content of acid insoluble matter (AIM) of at the most 2% by weight. The content of acid insoluble matter is, e.g., at the most 1.5% by weight, e.g., at the most 1.2% by weight, such as at the most 1.0% by weight. Furthermore, these products have a low protein content, the nitrogen content is typically at the most 0.25% by weight, such as at the most 0.20% by weight, e.g., at the most 0.15% by weight; a low cellulose content, i.e. typically in the range of 0.5% to 2.0% by weight, and preferably in the range of 1.0% to 1.5% by weight; and a low starch content, i.e. typically at the most 11% by weight.

When the carrageenan product is derived from a seaweed species of the family Solieriaceae, it has a nitrogen content which is typically at the most 0.25% by weight, such as at the most 0.20% by weight, e.g., at the most 0.15% by weight; a content of cellulose in the range of 2% to 15% by weight, such as in the range of 5% to 12% by weight, e.g., in the range of 7% to 10% by weight; a starch content of at the most 5.0% by weight, such as at the most 2.5% by weight, e.g., at the most 1.5% by weight; and an acid insoluble matter content of at the most 15.0% by weight, such as at the most 10% by weight, preferably at the most 8% by weight.

With respect to its properties, the product prepared by the shear stress treatment according to the invention will often be very close to commercially available purified carrageenan and, thus, difficult to distinguish therefrom. However, it is a characteristic feature of the shear stress treated product that it contains a certain minimum amount of cellulose, of the order of normally 0.5–2% by weight when the product is derived from Gigartinaceae and normally 2–15% by weight when the product is derived from Solieriaceae. In contrast to this, the purified carrageenan contains at the most 0.1% by weight of cellulose. This means that the cellulose content (of at least 0.5% by weight) makes it possible to distinguish the new product from purified carrageenan.

Thus, in another aspect, the invention relates to a carrageenan product containing at least 70% by weight carrageenan which shows a maximum swelling at a temperature which is at the most 85° C. when measuring a 3% by weight suspension of the product (at a dry matter content of at least 85% by weight and an average particle size of less than 0.18 mm) in a 0.7% by weight aqueous solution of KCl by means of a Brabender Viscograph operated at 60 rpm and at a heating rate of 1.5° C./min from an initial temperature of 35° C., and which product has a light transmission of at least 5% when measured in the form of a water gel containing 0.126% dry matter of the product by means of a spectrophotometer at a wavelength of 420 nm using a cuvette with a light path of 1 cm, and which product has a cellulose content of at least 0.5% by weight.

The starting material for the shear stress treatment method, that is, a carrageenan-containing seaweed material in which carrageenan containing 6-sulphated galactose units have been converted into 3,6-anhydro galactose units, is preferably produced by the above-mentioned base treatment method which constitutes another aspect of the invention, and the product of which can also be used per se as a valuable carrageenan material for thickening or gelling aqueous systems, such as is explained in the following.

The carrageenan starting material for the above-mentioned base treatment method is preferably in the form of pieces of at the most 5 cm.

In the present context, the term "substantially homogeneous" refers to the fact that the mixture of solvent and aqueous basic phase exists as a single liquid phase on a macroscopic level, containing both the water and the solvent. In other words, separation of the mixture into a macroscopic aqueous phase and a macroscopic solvent phase must not take place while the seaweed material is being reacted in the mixture. This is a prerequisite for the proper functioning of the method, since phase separation on a macroscopic level results in a situation where the seaweed material is found primarily in the aqueous phase, leading to an excessively water absorption and ultimately to dissolution of the seaweed structure and a loss of carrageenan. The mixture is preferably a solution, the preferred mixtures thus being systems in which the water, the solvent, the base and any salt present are mutually soluble at the temperature and pressure in question. This is discussed in greater detail below. However, it is also contemplated that macroscopically homogeneous mixtures which are not solutions, but which are homogeneous suspensions or emulsions, can be used. Furthermore, while the basic mixture should for the purposes of the present invention be substantially homogeneous, a certain minor phase separation can generally be accepted as long as the polarity of the reaction medium lies sufficiently below the limit at which the seaweed material swells excessively and disintegrates.

As will be further explained below, the preferred homogeneous solution is obtained by carefully controlling the relationship between the water concentration, the solvent concentration, the base concentration and the salt concentration.

The solvent used in the basic mixture and/or in any washing treatments subsequent to the reaction with the basic mixture may be any solvent which fulfils the following conditions:

Carrageenan must be substantially insoluble or at the most only slightly soluble in the solvent, since the method is based upon a basic modification of the carrageenan as defined above taking place at its natural location in the seaweed, i.e. in situ. Any carrageenan that is dissolved by the solvent will tend to be lost to the reaction mixture, thereby decreasing the yield of carrageenan in the final product. A further disadvantage resulting from dissolved carrageenan is an increased viscosity of the reaction mixture which makes separation of the treated seaweed material difficult.

The solvent should preferably be water-miscible, so as to enable a homogeneous mixture to be prepared and maintained without the use of, e.g., an emulsifier or excessive agitation.

The solvent must allow the seaweed to be maintained in a structurally essentially intact condition. This is due to the fact that the basic modification of the carrageenan is dependent upon the seaweed being swollen and permeable, so as to allow passage of reagents (the base) into the seaweed as well as passage of dissolved matter (i.e. dissolved cellulose, colouring matter, protein, starch, etc.) out of the seaweed. However, since the carrageenan matrix functions as a "container" in which the modification reaction takes place, the structure of this matrix must remain intact and must not disintegrate, as disintegration results in the formation of a paste which is difficult to handle.

The conditions which should be fulfilled by solvents used in the base treatment method of the invention are described in detail below together with a test which may be used to determine whether a given solvent is suitable in a given system.

The same solvent may be used in the above homogeneous basic mixture and for any subsequent washing treatments, or one solvent may be used for the heat treatment and another solvent, or optionally more than one solvent or a mixture of more than one solvent, may be used for the washing treatments.

The solvent may be a monohydric alcohol including methanol, ethanol, isopropanol, tert-butanol, sec-butanol, n-butanol, tert-amyl alcohol, neopentyl alcohol, sec-amyl alcohol or diethyl carbinol; a dihydric alcohol, such as ethylene glycol, propylene glycol or tetramethylene glycol; a trihydric alcohol including glycerol; a ketone, for example acetone, methyl ethyl ketone, methyl iso-butyl ketone or methyl tertbutyl ketone; or a glycol ether such as diethylene glycol monomethylether, ethylene glycol monoethylether, diethylene glycol mono-methylether or triethylene glycol dimethylether. Mixtures of two or more of the above solvents may also be employed in the basic mixture or in any solvent/water mixture.

The base used in the above step of basic modification of the seaweed starting material may suitably be a hydroxide or carbonate of an alkali metal, an alkaline earth metal or ammonium, for example sodium hydroxide, potassium hydroxide, barium hydroxide, calcium hydroxide, magnesium hydroxide, sodium carbonate, potassium carbonate, barium carbonate, calcium carbonate, magnesium carbonate, ammonium hydroxide or ammonium carbonate; an alkali metal alcoholate, for example sodium methoxide, sodium ethoxide or sodium isopropoxide; a basic inorganic phosphate, for example calcium phosphate, magnesium phosphate, trisodium phosphate or tripotassium phosphate. A combination of more than one of the above bases may also be used.

When "water" is referred to herein in connection with the amounts of water, seaweed, solvent and base in the reaction mixture of the seaweed starting material and the substantially homogeneous mixture, the amount of water is the sum of added water and water present in the seaweed starting material. Thus, when dried seaweed is treated, it may be necessary to add water either directly or by first soaking the dried seaweed in a saline solution (e.g., a sodium or potassium chloride solution). On the other hand, when fresh seaweed is used, the amount of water to be added will be determined taking into consideration the water content of the seaweed. In certain cases the method may be performed without added water, in which case the only water present in the substantially homogeneous basic mixture is that which is contained in the fresh seaweed or in dried seaweed which has been soaked in a saline solution.

As mentioned above, one of the advantages of the base treatment method of the invention is that an increased yield of carrageenan is obtained compared to known methods for producing semirefined and purified carrageenan products. This is partially due to the fact that the base treatment method of the invention is typically carried out on a relatively large amount of dry matter, based on the weight of reaction mixture, i.e. the starting material and the substantially homogeneous solvent/aqueous basic phase mixture. Typically, the content of seaweed dry matter in the reaction mixture is in the range of 5 to 20% by weight and preferably in the range of 10 to 15% by weight. In contrast, the prior art methods for the production of purified carrageenan are generally only able to work with dry matter contents of about 1–4%.

In order to improve the ratio of utilization per batch and the yield of the carrageenan product which is in a highly concentrated suspension in a swollen condition but in an insoluble form (gel), it is necessary to carefully control the coherence of the seaweed material during the treatment in the substantially homogeneous basic mixture of a solvent. The tendency of the various seaweed types to swell is dependent upon the temperature, the polarity of the liquid phase and the cation concentration.

In the following, a relatively simple test is described which may be used to determine a solvent's suitability for maintaining a solvent/water mixture's polarity within a range in which the seaweed material swells and absorbs the reaction mixture (the base), while at the same time preventing disintegration of the seaweed at the temperature in question and allowing a sufficient amount of the base to be dissolved so as to provide an acceptable reaction time:

a mixture of the solvent and water (135 g, containing the type and amount of solvent to be tested) is mixed in a 150 ml 3-necked flask and heated while stirring to the temperature at which base modification is to take place (a salt such as sodium chloride may be added to the mixture, depending on whether such a salt is to be present during the base modification). A conductivity electrode is placed at the surface of the mixture and the base to be used is added gradually while stirring slowly. When the conductivity changes abruptly, the point has been reached at which the reaction medium begins to separate into two phases, an aqueous bottom phase with a high base content and a top phase containing the majority of the solvent and having a low base concentration. The concentration of the solvent, water and the base is plotted in a phase diagram for the chosen salt content. If a given base concentration (enabling a single liquid phase to be maintained) is sufficient for the desired reaction, 15 g of chopped seaweed material is added while stirring slowly.

a colour change from red to green for seaweed material of the family Gigartinaceae indicates that the base has penetrated into the seaweed material, and the amount of liquid that can be drained from the seaweed after heat treatment for a few minutes is a measure of the amount of liquid which has been absorbed. To check for possible incomplete swelling, samples of the seaweed can be taken and investigated under a microscope for red areas into which the base has not penetrated. To check for possible dissolution of the seaweed material, the drained off liquid phase is refrigerated; if carrageenan has been lost to the liquid due to dissolution of the seaweed, this will be shown by gelation in the cooled liquid.

For seaweed of the family Solieriaceae (Eucheuma spp.), in which the algal pigment does not have such characteristic indicator properties, thin slices of the material are prepared using a razor blade after a few minutes of heat treatment, a universal indicator (dissolved in ethanol) which is effective in the pH range of 4–11, is added and the slices are observed under a microscope.

Possible dissolution of the seaweed material may be determined as explained above, i.e. by observation for gelation properties in the cooled liquid.

The above-described test procedure, i.e. the colour test for determination of the extent of base absorption, the tendency of the cooled liquid to gel, and the base concentration which can be achieved in the reaction medium, gives a qualitative indication of a solvent's suitability for use in the method of the invention and allows the determination of acceptable base, solvent and salt concentrations for the solvent in question.

The weight ratio between solvent and water in the reaction mixture is from 5:95 to 50:50, such as from 10:90 to 40:60, e.g., from 12:88 to 30:70 and including from 15:85 to 25:75.

The concentration of the base in the reaction mixture as defined above is typically between 0.25 M/kg liquid phase to 3.0 M/kg liquid phase, and preferably between 0.7 M/kg liquid phase to 1.5 M/kg liquid phase.

In addition, the reaction mixture may, if desired, contain further substances such as anti-foaming agents, as well as neutral salts, e.g., selected from the group consisting of neutral salts of K, Na, Ca, Mg and Ba, and mixtures thereof.

The reaction of the seaweed starting material may advantageously be carried out at a temperature in the range of 50°–150° C. such as in the range of 80°–100° C. and at a pressure of from about atmospheric pressure to about 3 atm for a period of about 15 min to 30 h, typically from about 1 h to about 6 h.

After treating the seaweed starting material as defined above, the treated seaweed is separated from the reaction mixture, e.g., by draining or filtering, after which the treated seaweed is washed in a first solvent/water mixture, e.g., at a temperature of at least 50° C., e.g., in the range of 50°–80° C., so as to remove the basic reagents as well as dissolved impurities. The solvent/water mixture may also be used to enable an ion exchange of the product to take place by adding soluble salts to the wash. By use of the method of the invention, however, it is possible to control the cation content of the final product, which is clearly advantageous since it allows the product to be designed according to the intended use. Thus, the homogeneous basic mixture, the first solvent/water mixture and any additional solvent/water mixture may, if desired, contain added neutral salts, e.g., selected from the group consisting of neutral salts of K, Na, Ca, Mg and Ba, and mixtures thereof.

The first solvent/water mixture will typically, although not necessarily, contain the same solvent as the substantially homogeneous basic mixture, and the concentration of the solvent in the first solvent/water mixture will typically be as high as or higher than the concentration of the solvent concentration in the substantially homogeneous basic mixture. The weight ratio between solvent and water in the first solvent/water mixture is typically from 15:85 to 60:40, more typically from 20:80 to 50:50, e.g., from 25:75 to 40:60. The first wash as well as any subsequent washes will typically take place at atmospheric pressure, although a pressure of more than 1 atm may be used, and for a period of at least about 5 minutes for each wash, more typically at least about 10 minutes for each wash.

After washing in the first solvent/water mixture, the treated seaweed is separated from the mixture and is preferably subjected to at least one additional wash in an additional solvent/water mixture, in order to remove as much of the basic reagents and dissolved impurities as possible. Typically, the treated seaweed is subjected to two additional washes (i.e. a total of three washes), but further washes may of course be used. It has been found, using the method of the invention that after three washes, the treated seaweed is generally essentially free of the basic reagent used for modification of the carrageenan. The weight ratio between solvent and water in any additional solvent/water mixture is typically from 25:75 to 99:1.

The additional washes are carried out in essentially the same manner as the first wash. However, the concentration of the solvent in a second or further wash will typically be as high as or higher than the concentration used in the preceding wash. Preferably, the additional washes and at least the last one are carried out using a solvent which is more volatile than the solvents used in any preceding washing step, and which alone or together with water is easily evaporated during the subsequent drying step.

The reacted and washed seaweed material is subsequently subjected to a drying step such as vacuum evaporation, fluid bed drying using air at a temperature of, e.g., about 90° C. for, e.g., about 20 min, or by conventional air drying at, e.g., 40°–60° C. The material may be dried to a dry matter content of at least 25% by weight, preferably at least 30% by weight, such as about at least 40% by weight, when it is used as a starting material for the shear stress treatment. The drying to a dry matter content of 30% to 40% by weight will result in a material which is substantially free of organic solvent. Alternatively, the treated and washed seaweed material may be dried to a dry matter content of 85% by weight, preferably to a dry matter content of 90% by weight, such as 95% by weight and ground to a suitable particle size, e.g., using known procedures for grinding. The resulting product may be used per se for thickening and gelling purposes.

The shear stress treated carrageenan product according to the invention can be produced in a continuous production process incorporating the base treatment method by means of one extruder, or two extruders in series, equipped with the necessary heating devices, inlets and outlets for seaweed starting material, the reaction mixture, and solvent water mixtures, and screw elements designed so that the extruder(s) is/are divided into processing sections performing the various processing steps. In a first processing section of the extruder, the seaweed starting material and the mixture of the base, the water and the organic solvent are mixed and heat treated. In a subsequent processing section the reaction liquid is drained off whereupon the treated seaweed material is washed in a subsequent section performing countercurrent washing, drained and partly dried. In the last processing section, or alternatively in a separate extruder, the treated seaweed material is subjected to the shear stress treatment.

BRIEF DESCRIPTION OF THE DRAWINGS

The present invention is further illustrated by the following examples and Figures in which.

MATERIALS AND METHODS

Determination of nitrogen content

Figure 1:
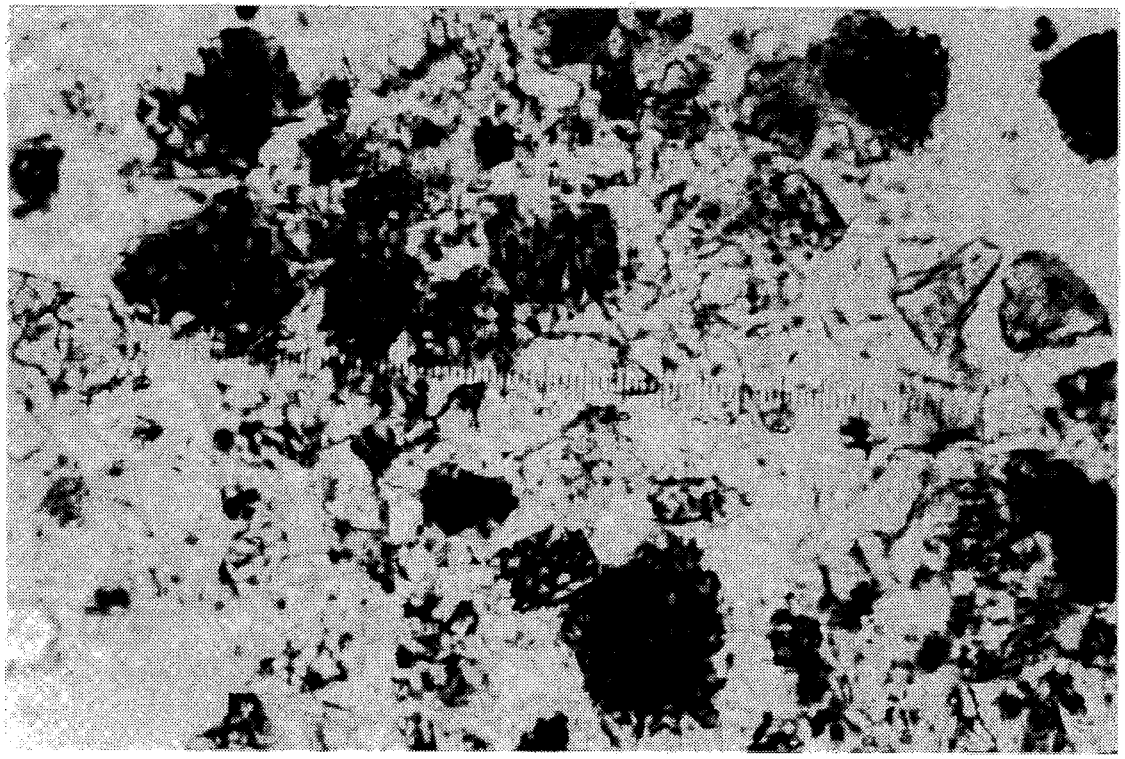
FIG. 1 shows a microscopic presentation of a typical non-extruded product at a magnification of 250x.

The values given in the examples for nitrogen content were determined using the Kjeldahl method.

Determination of sodium, potassium and calcium content

A sample of the product is ashed by weighing the sample into a porcelain crucible which is placed in a furnace preheated to 600° C. and left to ash overnight. The crucible is then transferred to a desiccator, cooled and weighed. The ashed material is dissolved in $HNO_3$ and is diluted to an appropriate concentration. The concentration of sodium, potassium and calcium, respectively, is determined using Flame Atomic Absorption Spectroscopy by means of Varian SpectrAA 400.

Determination of cellulose content

The cellulose content is determined as the difference between the glucose content after hydrolysis in 12M $H_2SO_4$ and the glucose content after hydrolysis in 2M $H_2SO_4$ (Englyst procedure)

2×100.0 mg of the sample is weighed in a test tube with a screw top. 5 ml of 12M $H_2SO_4$ is added to one of the test tubes, which is placed in a water bath at 35° C. for one hour and shaken every 10 minutes. 25 ml of water is then added and the test tube is placed in a water bath at 100° C. with agitation for 1 hour. 30 ml of 2M $H_2SO_4$ is added to the other test tube, which is then placed in a water bath at 100° C. for one hour. Both test tubes are then allowed to cool and the contents are diluted at least 5 times for enzymatic determination of the glucose content.

Determination of the glucose content is performed by adding 5 ml of an enzyme solution (glucose oxidase) to 250 ml of a sample to be tested or a standard. After 60 minutes, the absorbency is measured at 334 nm. The glucose concentration of the samples is determined using a standard curve.

The cellulose content (%) is calculated according to the following equation:

$$\% \text{ cellulose} = \left( \frac{\text{glucose}(12 \text{ M } H_2SO_4) \cdot D_1 \cdot 30}{G_1 \cdot 10} - \frac{\text{glucose}(2 \text{ M } H_2SO_4) \cdot D_2 \cdot 30}{G_2 \cdot 10} \right) \cdot 0.89$$

in which $D_1$ and $D_2$ are dilution factors, and $G_1$ and $G_2$ are the weight in grams of the samples.

The accuracy of the above-mentioned method does not permit exact determination of less than 1.0% by weight of cellulose. However, where a cellulose content of "<1.0% by weight" is indicated in the examples herein, the cellulose content is at least 0.5% by weight.

Determination of starch content

An appropriate sample of the carrageenan- and starch-containing product is treated with amyloglucosidase (supplied by Boehringer) in a solution of water and dimethyl sulfoxide at pH 5–6 whereby the starch content is transformed into glucose.

The glucose content is determined as described above (cf. determination of cellulose).

Determination of acid insoluble matter (AIM)

The method used for the determination of acid insoluble matter is described in *Food Chemical Codex* (FCC), 1st Edition, p. 393.

1.5000 g of the sample to be tested is weighed in a 250 ml beaker, to which 135 ml distilled water and 15 ml 10% $H_2SO_4$ is added. The beaker is covered with a watch glass and the solution is boiled using a sand bath or a water bath for 6 hours, the sides of the beaker are scraped at regular intervals with a spatula with a piece of rubber tubing attached. Distilled water corresponding to the amount of water which has evaporated is added, and at the end of the 6 hours 0.5000 g of filter earth is added. The solution is filtered through a dried and weighed Buchner filter with a filter plate at the bottom, and the residue is washed several times with warm distilled water. The glass filter is then dried for 3 hours at 105° C., cooled in a desiccator and weighed after 3 hours. The content of acid insoluble matter is calculated on the basis of the weight of the sample before and after boiling in the sulphuric acid solution.

Determination of viscosity

Aqueous solutions containing 1.5% by weight of the carrageenan product and 0.193% by weight of $CaCl_2.2H_2O$ (corresponding to 3.5% Ca calculated on the carrageenan product) were prepared at a temperature of 75° C. By means of a Brookfield LVT viscometer, using an appropriate spindle, the viscosity of the solution was measured at a temperature of 75° C. and 60 rpm. Spindle no. 1 was used when the readings were less than 100 cP, and spindle no. 2 was used when the readings were higher than 100 cP.

Determination of gel strength

Aqueous solutions containing 1.26% dry matter of the carrageenan product by weight of the carrageenan product (dry matter content 90%), 0.162% by weight of $CaCl_2.2H_2O$ (corresponding to 3.5% Ca calculated on the carrageenan product) and 0.667% by weight of KCl were prepared at a temperature of 90° C. and filled into two cylindrical (diameter 8 cm, height 4.5 cm) glass dishes. The surface of the solution was covered with thin circular sheet of plastic foil to prevent evaporation and formation of air bubbles. After cooling at ambient temperature until next day a gel was formed. After having removed the plastic foil the gel strength (expressed in g) was measured in the centre of each gel by means of a Stevens Texture Analyzer using the following analytical parameters:

Plunger: 12 mm diameter

Distance: 6 mm

Speed: 0.5 mm/sec

Determination of turbidity of water gels

The water-gels are prepared in the same way as the water-gels for determination of gel strength (as disclosed above), the only difference being that no $CaCl_2.2H_2O$ is added and the cooling is provided in a cuvette having the dimensions of 1*1 cm. When cooled to room temperature the transmission of light is measured by means of a spectrophotometer (Spectronic 2000) at a wave length of 420 nm. The transmission of light is measured in two directions being at right angles to each other.

EXAMPLES

Example 1

Dried seaweed material of the species Iridaea ciliata, Iridaea laminarioides, collection 1, *Iridaea laminarioides*, collection 2 and *Gigartina skottsbergii*, having dry matter contents of 80.5% to 94.8% by weight was broken into pieces of 2 to 5 cm. Using a 20 l closed stainless steel reactor with heating mantel and stirrer the seaweed material of either species was treated under stirring with a mixture comprising potassium hydroxide, isopropanol and water at a temperature of 82° C.

The composition of the reaction mixture is shown in Table 1.

During the reaction, samples of the seaweed material were withdrawn from the reaction mixture after 1, 3, 5, 7, and 9 hours. The samples were washed three times using 30%, 40%, and 50% by weight, respectively, of isopropanol/water mixtures under stirring at a temperature of 75° C. The samples were dried at 40° C. to a dry matter content of 88% to 90% by weight followed by grinding to a particle size of less than 0.18 mm.

The gelling and thickening properties of the carrageenan products were tested in demineralized water (cf. Table 2 and 3).

TABLE 1

The composition of the reaction mixture

|  | I. ciliata | I. laminarioides coll. 1 | I. laminarioides coll. 2 | G. skottsbergii |
| --- | --- | --- | --- | --- |
| Seaweed dry matter, g | 2710 | 2710 | 2673 | 2765 |
| wt % | 13.6 | 15.1 | 13.4 | 13.8 |
| Anhydrous KOH, g | 1119 | 986 | 1114 | 1119 |
| wt % | 5.6 | 5.5 | 5.6 | 5.6 |
| Isopropanol, g | 4042 | 3560 | 4053 | 4029 |
| wt % | 20.2 | 19.8 | 20.3 | 20.1 |
| Water g | 12128 | 10679 | 12160 | 12087 |
| wt % | 60.6 | 59.5 | 60.8 | 60.4 |

TABLE 2

Viscosity (expressed in cP) of the carrageenan products obtained in Example 1 measured in demineralized water at 75° C. and 60 rpm

| Species | Reaction time | | | | |
| --- | --- | --- | --- | --- | --- |
|  | 1 hrs | 3 hrs | 5 hrs | 7 hrs | 9 hrs |
| I. ciliata | 172.0 | 106.0 | 60.3 | 34.9 | 28.2 |
| I. laminarioides, coll. 1 | 49.8 | 37.7 | 31.1 | 24.0 | 20.4 |
| I. laminarioides, coll. 2 | 21.4 | 16.7 | 13.7 | 11.0 | — |
| G. skottsbergii | 329.0 | 174.0 | 85.3 | 54.1 | 41.9 |

TABLE 3

Gel strength (expressed in g) of the carrageenan products obtained in Example 1 measured in demineralized water

| Species | Reaction time | | | | |
| --- | --- | --- | --- | --- | --- |
|  | 1 hrs | 3 hrs | 5 hrs | 7 hrs | 9 hrs |
| I. ciliata | 365 | 440 | 360 | 295 | 275 |
| I. laminarioides, coll. 1 | 330 | 340 | 315 | 270 | 255 |
| I. laminari- | 200 | 225 | 200 | 160 | — |

TABLE 3-continued

Gel strength (expressed in g) of the carrageenan products obtained in Example 1 measured in demineralized water

| | Reaction time | | | | |
|---|---|---|---|---|---|
| Species | 1 hrs | 3 hrs | 5 hrs | 7 hrs | 9 hrs |
| oides, coll. 2 | | | | | |
| G. skotts-bergii | 190 | 195 | 190 | 170 | 155 |

Example 2

Dried seaweed materials of the species *Iridaea ciliata* and *Gigartina skottsbergii* with dry matter contents of about 83% by weight were broken into pieces of 2 to 5 cm. Using the reactor from Example 1 the seaweed material was treated under stirring with potassium hydroxide in isopropanol and water, at a temperature of 82° C.

The composition of the reaction mixture is shown in Table 4.

After the reaction the solvent mixture was drained off through the bottom valve of the reactor and the treated seaweed material was washed under stirring with isopropanol/water mixtures, with and without potassium chloride added, at a temperature of 75° C. according to the scheme shown in Table 5.

The washed seaweed material was finally dried at a temperature of 40° C. to a dry matter content of 88–90% by weight followed by grinding to a particle size of less than 0.18 mm. Yields and the analytical characteristics of the products are shown in Table 6.

TABLE 4

The composition of the reaction mixture

| Reaction | Gigartina skotts-bergii | | Iridaea ciliata | |
|---|---|---|---|---|
| time | 7 hrs | 7 hrs | 5 hrs | 5 hrs |
| Seaweed dry matter, g | 1844 | 1844 | 2723 | 1806 |
| wt % | 9.5 | 9.5 | 13.6 | 9.0 |
| Anhydrous KOH, g | 1114 | 1114 | 1114 | 1114 |
| wt % | 5.7 | 5.7 | 5.6 | 5.6 |
| Isopropanol, g | 4000 | 4000 | 4110 | 4270 |
| wt % | 20.5 | 20.5 | 20.6 | 21.4 |
| Water, g | 12542 | 12542 | 12048 | 12810 |
| wt % | 64.3 | 64.3 | 60.3 | 64.1 |

TABLE 5

Washing procedures

| Reaction | Gigartina skotts-bergii | | Iridaea ciliata | |
|---|---|---|---|---|
| time | 7 hrs | 7 hrs | 5 hrs | 5 hrs |
| 30 wt % aqueous isopropanol | 1X | 1X | | |
| 35 wt % aqueous isopropanol | 1X | 1X | | |
| 40 wt % aqueous isopropanol | 1X | 1X | 2X | 2X |

TABLE 5-continued

Washing procedures

| Reaction | Gigartina skotts-bergii | | Iridaea ciliata | |
|---|---|---|---|---|
| time | 7 hrs | 7 hrs | 5 hrs | 5 hrs |
| 50 wt % aqueous isopropanol | | | 1X | 1X |
| 30 wt % aqueous isopropanol + 5 wt % KCl | | 1X | | 1X |

TABLE 6

Yields and characteristics of the carrageenan products obtained in Example 2

| Reaction | Gigartina skotts-bergii | | Iridaea ciliata | |
|---|---|---|---|---|
| time | 7 hrs | 7 hrs | 5 hrs | 5 hrs |
| Yield, g | 1351 | 1410 | 950 | 1004 |
| Cellulose, wt % | <1.0 | — | 1.0 | — |
| Acid Insoluble Matter (AIM), wt % | — | <0.5 | — | — |
| Calcium, wt % | 0.44 | 0.36 | 0.60 | 0.50 |
| Sodium, wt % | 0.90 | 0.24 | 1.22 | 0.26 |
| Potassium, wt % | 8.69 | 13.75 | 8.92 | 14.10 |

Example 3

Dried seaweed of the species *Gigartina skottsbergii* having a dry matter content of 77.1% by weight was cut into pieces of 5 to 10 mm. 441.8 g of a 27% (w/w) mixture of methanol in water was transferred to a 2 l 3-necked reaction flask equipped with a mechanical stirrer, a reflux condenser and a heating mantle and 35.5 g of potassium hydroxide (85%) was added slowly while stirring gently. When the base was dissolved, 60 g of the dried seaweed was added to the solution and the temperature was increased to the reflux temperature of 83.2° C. The mixture was refluxed for 3 hours while stirring slowly.

The liquid phase was drained off through a fine sieve (1 mm) and the seaweed material was returned to the flask and covered with 300 g of a 30% (w/w) isopropanol/water mixture. While stirring slowly the mixture was kept at a temperature of 75° C. for 30 minutes. The mixture was again drained through the same sieve and the washing procedure was repeated twice with a 35% and 40% (w/w) isopropanol/water mixture, respectively.

The obtained carrageenan product was dried at 40° C. to a dry matter content of about 90% and ground to a particle size of less than 0.18 mm.

The characteristics of the product are shown in Table 7.

Example 4

A carrageenan product was prepared essentially as described in Example 3, the only difference being that the dried seaweed material (60 g) was treated with an aqueous basic organic solvent mixture (441.8 g) in which methanol was replaced by acetone. The mixture was refluxed for 6 hours at a reflux temperature of 63.5° C.

The characteristics of the product are shown in Table 7.

Example 5

A carrageenan product was prepared essentially as described in Example 3, the only difference being, that the dried seaweed material (60 g) was treated with an aqueous basic organic solvent mixture (441.8 g) in which methanol was replaced by ethanol. The mixture was refluxed for 3 hours at the reflux temperature of 84.8° C.

The characteristics of the product are shown in Table 7.

Example 6

A carrageenan product was prepared essentially as described in Example 3, the only differences being that the dried seaweed material (60 g) was treated with an aqueous basic organic solvent mixture (441.8 g) in which methanol was replaced by isopropanol and the potassium hydroxide was replaced by 48.5 g potassium phosphate ($K_3PO_4.3H_2O$). The mixture was refluxed for 19 hours at the reflux temperature of 82° C.

The product was dried at 40° C. and ground to a particle size of less than 0.18 mm.

The characteristics of the product are shown in Table 7.

TABLE 7

Characteristics of the carrageenan products obtained in Examples 3–6

|  | Exam. | Exam. 4 | Exam. | Exam. 6 |
| --- | --- | --- | --- | --- |
| Dry matter, wt % | 89.9 | 90.8 | 90.7 | 91.4 |
| Acid Insoluble Matter (AIM), wt % | 1.0 | 2.0 | 0.5 | 1.0 |
| Nitrogen, wt % | 0.11 | 0.13 | 0.07 | 0.21 |
| Starch, wt % | 4.6 | 4.5 | 4.5 | 3.4 |
| Viscosity, cP | 75.0 | 131.0 | 73.6 | 25.0 |
| Gel strength, g | 270.0 | 260.0 | 255.0 | 330.0 |

Example 7

One part of dried seaweed of the species *G. skottsbergii* and *I.laminarioides*, collection 1, respectively, was pretreated by washing with 10–12 parts of an aqueous solution containing 10 wt % potassium chloride at ambient temperature.

The wet pre-washed seaweed was cut into pieces of 5–10 cm and 45 kg of this seaweed, comprising 35 wt % dry matter was transferred to a closed reactor equipped with a stirring equipment and a heating mantle. A mixture comprising 20.0 kg 80 wt % isopropanol, 9.5 kg 46 wt % potassium hydroxide and 5.5 kg water was added to the seaweed under stirring and heating conditions. The solution was drained off and the seaweed material was washed with a solution of aqueous isopropanol (30 wt %) followed by two washing steps, each washing step with a solution of 30 wt % isopropanol and 70% of a 3.5 wt % solution of sodium chloride except that sodium chloride was replaced by 3.5 wt % potassium chloride in the second washing step of the seaweed material of *Gigartina skottsbergii*. When drained off the seaweed was dried to a dry matter content of about 87–90% by weight.

Table 8 shows the reaction conditions for these experiments and Table 9 shows the characteristics of the products.

TABLE 8

Dry matter content of the seaweed in the reaction mixture, reaction temperature and time and yield of Experiment 7

| Species | seaweed dry matter wt % | reaction temperature (°C.)/ time (hrs) | yield wt % |
| --- | --- | --- | --- |
| G. skottsbergii | 18.3 | 90/3 | 67.8 |
| I. laminarioides | 19.0 | 82/1.5 | 69.2 |

TABLE 9

Characteristics of the carrageenan products produced according to conditions defined in Table 8

|  | G. skottsbergii | I. laminarioides |
| --- | --- | --- |
| Viscosity, cP | 50.8 | 51.8 |
| Nitrogen, wt % | 0.05 | 0.15 |
| Cellulose, wt % | 1.0 | 1.1 |
| Acid Insoluble Matter (AIM), wt % | 0.8 | 2.0 |
| Sodium wt % | 2.4 | 5.7 |
| Potassium wt % | 7.2 | 3.9 |
| Calcium wt % | 0.35 | 0.47 |

Seaweed of the species EUCHEUMA COTTONII

Partly dried seaweed of the species *Eucheuma cottonii* having a dry matter content of 60 wt % to 75 wt % was washed in a 3.5 wt % sodium chloride solution to remove sand and other impurities adhering to the seaweed and then chopped into pieces of about 2 cm. The washed seaweed material was dried to a dry matter content of 92.7 wt %. By analysis the dried seaweed material was found to contain 5.5 wt % sodium (Na), 2.2 wt % potassium (K), 0.25 wt % calcium (Ca), 4.6 wt % chloride ($Cl^-$), 0.4 wt % nitrogen (N), 2.0 wt % starch, 8.0 wt % cellulose and 8.65 wt % acid insoluble matter (AIM).

This seaweed material was used as starting material in the following Examples 8–12.

Example 8

Dried seaweed (55 g) of the species *Eucheuma cottonii* was added to a 1 litre 3-necked reaction flask equipped with a mechanical stirrer, vertical condenser and heating mantle.

The seaweed was stirred at a temperature of 82° C. for 3 hours with a homogeneous basic mixture comprising water (302.0 g), isopropanol (100.7 g) and potassium hydroxide (32.3 g, 85 wt %, 0.489M).

Table 10 shows the composition of the reaction mixture during the heat treatment.

After completion of the reaction the solvent mixture was drained off and the treated seaweed was washed twice with 30 wt % isopropanol/water mixture and twice with 40 wt % isopropanol/water mixture. The washings were carried out at a temperature of 60° C. for 15 minutes while gently stirring the mixture. After each washing procedure the solvent mixture was drained off.

Finally, the washed seaweed material was dried at a temperature of 40° C. giving 41.2 g product which was ground to a particle size of less than 0.075 mm.

The characteristics of the product are shown in Table 11.

Example 9

Dried seaweed (55 g) of the type *Eucheuma cottonii* was added to a 1 litre 3-necked reaction flask as used in Example 8 and was treated at a temperature of 82° C. with a homogeneous basic mixture comprising water (280 g), isopropanol (120 g), sodium hydroxide (12.68 g, 0.317M) and potassium hydroxide (11.24 g, 85 wt %, 0.170M).

After 50 minutes of heat treatment the reaction mixture was a sticky and lumpy mass of a nearly disintegrated seaweed material and dissolved carrageenan.

The reaction mixture was not worked up.

Table 10 shows the composition of the mixture during the heat treatment.

This experiment was carried out using a reaction mixture in which the basic mixture did not fulfil the requirements for homogeneity in the reaction mixture and, therefore, a phase separation of the reaction mixture was obtained.

Example 10

Dried seaweed (55 g) of the type *Eucheuma cottonii* was added to a 1 litre 3-necked reaction flask of same type as in Example 8 and was treated for a period of one hour and 45 minutes at a temperature of 82° C. with a homogeneous basic mixture comprising water (300 g), isopropanol (100 g), sodium hydroxide (11.70 g, 0.293M) and potassium hydroxide (12.85 g, 85 wt %, 0,195M).

During the heat treatment for a period of 3 hours and 15 minutes the seaweed was strongly swelled but showed no tendency to disintegrate into a sticky and lumpy mass.

Table 10 shows the composition of the mixture during the heat treatment and the characteristics of the product obtained are shown in Table 11.

TABLE 10

| The composition of the reaction mixture | | | |
|---|---|---|---|
| Examples | 8 | 9 | 10 |
| Seaweed, dry matter, (g) | 50.98 | 50.98 | 50.98 |
| Water (g) | 310.86 | 285.71 | 305.95 |
| Isopropanol (g) | 100.70 | 120.00 | 100.00 |
| Hydroxide (OH⁻), M | 0.489 | 0.487 | 0.488 |
| Sodium (Na⁺), M | 0.132 | 0.449 | 0.425 |
| Potassium (K⁺), M | 0.520 | 0.201 | 0.226 |
| Molar ratio Na:K | 0.25 | 2.23 | 1.88 |

TABLE 11

| Characteristics of the products obtained in Examples 8 and 10 | | |
|---|---|---|
| Examples | 8 | 10 |
| Dry matter, wt % | 89.8 | 90.4 |
| Starch, wt % | 1.5 | 2.5 |
| Cellulose, wt % | 8.4 | 8.6 |
| Acid insoluble matter (AIM), wt % | 12.8 | 11.8 |
| Nitrogen, wt % | 0.10 | 0.10 |
| Sodium, wt % | 0.58 | 2.2 |
| Potassium, wt % | 6.3 | 3.6 |
| Calcium, wt % | 0.11 | 0.12 |
| Chloride, wt % | <0.05 | <0.05 |
| Molar ratio Na:K | 0.16 | 1.04 |

SEAWEED OF THE SPECIES EUCHEUMA SPINOSUM

Partly dried seaweed of the species *Eucheuma spinosum* having a dry matter content of 60 wt % to 75 wt % was washed in a 3.5 wt % sodium chloride solution to remove sand and other impurities adhering to the seaweed and then chopped into pieces of about 2 cm. The seaweed material was dried to a dry matter content of 94.2 wt %. By analysis the dried seaweed material was found to contain 4.1 wt % sodium (Na), 6.5 wt % potassium (K), 0.55 wt % calcium (Ca), 4.8 wt % chloride (Cl⁻), 0.64 wt % nitrogen (N), 2.0 wt % starch, 4.7 wt % cellulose and 6.4 wt % acid insoluble matter (AIM).

This seaweed material was used as starting material in the following Examples 11–13.

Example 11

Dried seaweed (50 g) of the species *Eucheuma spinosum* was added to a 1 litre 3-necked reaction flask equipped with a mechanical stirrer, reflux condenser and heating mantle. The seaweed was stirred at a temperature of 82° C. for 3 hours with a homogeneous basic mixture comprising water (312.8 g), isopropanol (104.3 g) and potassium hydroxide (32.9 g, 85 wt %, 0.498M).

Table 12 shows the composition of the reaction mixture during the heat treatment.

After completion of the reaction the solvent mixture was drained off and the treated seaweed was washed twice with 30 wt % isopropanol/water mixture and twice with 40 wt % isopropanol/water mixture. The washings were carried out at a temperature of 60° C. for 15 minutes while gently stirring the mixture. After each washing procedure the solvent mixture was drained off.

Finally, the washed seaweed material was dried at a temperature of 40° C. giving 31.4 g product which was ground to a particle size of less than 0.075 mm.

The characteristics of the product are shown in Table 13.

Example 12

Dried seaweed (50 g) of the type *Eucheuma spinosum* was added to a 1 litre 3-necked reaction flask as used in Example 11 and was treated for a period of three hours at a temperature of 82° C. with a homogeneous basic mixture comprising water (319.6 g), isopropanol (106.5 g), sodium hydroxide (14.0 g, 0.35M) and potassium hydroxide (9.88 g, 85 wt %, 0.15M).

Table 12 shows the composition of the mixture during the heat treatment. During the heat treatment the seaweed was strongly swelled but no disintegration could be observed.

After completion of the reaction the solvent mixture was drained off and the treated seaweed was washed twice with 30 wt % isopropanol/water mixture at a temperature of 60° C. for 15 minutes, once with 40 wt % isopropanol/water mixture at a temperature of 65° C. for 15 minutes and once with 40 wt % isopropanol/water mixture at a temperature of 60° C. for 15 minutes.

Finally, the washed seaweed material was dried at a temperature of 40° C. and ground to a particle size of less than 0.075 mm.

The characteristics of the product are shown in Table 13.

Example 13

Heat treatments as described in the previous Examples 11–12 of the dried seaweed (50 g) of the species *Eucheuma spinosum* with homogeneous basic mixtures using a molar ratio of sodium hydroxide:potassium hydroxide equal to or greater than about 4 resulted in excessive disintegration of the seaweed giving a sticky and lumpy reaction mixture.

TABLE 12

The composition of the reaction mixture

| Examples | 11 | 12 |
|---|---|---|
| Seaweed, dry matter, (g) | 47.1 | 47.1 |
| Water, (g) | 320.6 | 323.9 |
| Isopropanol, (g) | 104.3 | 106.5 |
| Hydroxide, M | 0.499 | 0.500 |
| Sodium, M | 0.089 | 0.439 |
| Potassium, M | 0.582 | 0.233 |
| Molar ratio, Na:K | 0.15 | 1.88 |

TABLE 13

Characteristics of the products obtained in Examples 11 and 12

| Examples | 11 | 12 |
|---|---|---|
| Dry matter, wt % | 90.8 | 90.4 |
| Starch, wt % | 4.3 | 2.6 |
| Cellulose, wt % | 5.6 | 4.7 |
| Acid insoluble matter (AIM), wt % | 7.6 | 6.1 |
| Nitrogen, wt % | 0.10 | 0.10 |
| Sodium, wt % | 0.54 | 3.4 |
| Potassium, wt % | 9.2 | 4.5 |
| Calcium, wt % | 0.38 | 0.32 |
| Chloride, wt % | <0.05 | <0.05 |
| Molar ratio, Na:K | 0.10 | 1.28 |

Example 14

One part by weight of dried seaweed of the species *Gigartina skottsbergii* having a dry matter content of about 80% by weight was pre-treated at ambient temperature by washing with 10–12 parts by weight of an aqueous solution containing 10 wt % potassium chloride.

The wet pre-washed seaweed was cut into pieces of 1–5 cm, and 35 kg of this seaweed comprising about 30 wt % dry matter was transferred to a closed reactor equipped with a stirrer and a heating mantle. A mixture comprising 12.0 kg of isopropanol, 7.8 kg of 46 wt % potassium hydroxide and 26.0 kg of water was added to the seaweed. The mixture was heated under stirring. After stirring for 2 hours at 95° C. the mixture was cooled to about 80° C., and the solution was drained off.

Table 14 shows the composition of the reaction mixture during the heat treatment.

The treated seaweed material was then washed three times with an aqueous solution of isopropanol (30 wt %) under stirring at a temperature of 82° C. for 30 minutes. After each washing step the solution was drained off. Finally, the seaweed material was washed once with an aqueous solution of isopropanol (10 wt %) containing potassium chloride (5 wt %) under stirring at ambient temperature for 30 minutes.

The washing solution was drained off and the majority of the product was partly dried at a temperature of 50° C. for 1 hour at a slightly reduced pressure to remove the organic solvent giving a product with a dry matter content of 37.5 wt %. For purposes of comparison a smaller part of the washed seaweed was dried at a temperature of 40° C. for about 24 hours to a dry matter content of 92.3 wt % and ground to a particle size of less than 0.180 mm.

The characteristics of the product are shown in Table 15.

The semi-dried product was subjected to shear stress treatment in a heated state before extrusion by means of an experimental extruder (Brabender EXTRUDIOGRAPH 19/25, where 19 is the diameter in mm of the screw, and 25 is the ratio between the length and the diameter of the screw; screw: 4:1 DZ mixer; die-type: round die, diameter 4 mm).

The semi-dried product was fed to the extruder at a flow rate of 15–30 g/min and processed under the following conditions:

| Temperature of extruder: | |
|---|---|
| Near the feed inlet: | 77–78° C. |
| Central zone: | 123–124° C. |
| Near the discharge end: | 128–129° C. |
| Internal pressure near the discharge end: | 10–11 bar |
| Number of revolutions: | 39 rpm |
| Torque: | 4–5 Nm |
| Back force: | 0.3–0.4 kN |

The product was discharged as a gel string which after cooling and hardening was cut into pieces and dried at a temperature of 40° C. to a dry matter content of 93.6 wt % followed by grinding to a particle size of less than 0.18 mm.

The product obtained produced a water gel having a light transmission of %T=16.4

The viscosity of the product was measured and the result is shown in Table 16 together with the viscosity of the nonextruded product.

Example 15

Dried seaweed of the species *Gigartina skottsbergii* was treated essentially as described in Example 14, the only difference being that the reaction mixture was supplemented with 1.0 kg of sodium hydroxide (50 wt %).

Table 14 shows the composition of the reaction mixture during the heat treatment.

A semi-dried product with a dry matter content of 41.4 wt % was obtained. For purposes of comparison a smaller part of this product was dried to a dry matter content of 93.3 wt % and ground to a particle size of less than 0.180 mm.

The characteristics of the product are shown in Table 15.

The semi-dried product was fed to the same extruder as used in Example 14 and processed under the following conditions:

| Temperature of extruder: | |
|---|---|
| Near the feed inlet: | 74–75° C. |
| Central zone: | 117–118° C. |
| Near the discharge end: | 130–131° C. |
| Internal pressure near the discharge end: | 15–16 bar |
| Number of revolutions: | 39 rpm |
| Torque: | 6–7 Nm |
| Back force: | 0.4–0.5 kN |

After drying the extruded product followed by grinding to a particle size less than 0.18 mm a product containing a dry matter of 94.5 wt % was obtained.

The product obtained produced a water gel having a light transmission of %T=14.5

In Table 16 the viscosity of the product is shown together with the viscosity of the corresponding non-extruded product.

Example 16

Dried seaweed of the species *Iridaea ciliata* was treated essentially as described in Example 14, the only difference being that the reaction time was 1.5 hours and that the last (the 4th) washing step was accomplished with an aqueous solution of isopropanol (20 wt %) containing potassium chloride (5 wt %).

Table 14 shows the composition of the reaction mixture during the heat treatment.

A semi-dried product with a dry matter content of 49.1 wt % was obtained. For purposes of comparison a smaller part of this product was dried to a dry matter content of 94.0 wt % and ground to a particle size of less than 0.180 mm.

The characteristics of the product are shown in Table 15.

The semi-dried product was fed to the same extruder as used in Example 14 and processed under the following conditions:

| Temperature of extruder: | |
|---|---|
| Near the feed inlet: | 80–85° C. |
| Central zone: | 120–121° C. |
| Near the discharge end: | 127–128° C. |
| Internal pressure near the discharge end: | 13–14 bar |
| Number of revolutions: | 39 rpm |
| Torque: | 6–7 Nm |
| Back force: | 0.4–0.5 kN |

After drying the extruded product followed by grinding to a particle size less than 0.18 mm a product was obtained containing a dry matter of 95.2 wt %.

The product obtained produced a water gel having a light transmission of %T=15.1

In Table 16 the viscosity of the product is shown together with the viscosity of the corresponding non-extruded product.

TABLE 14

The composition of the reaction mixture during the heat treatment

| | Example 14 | Example 15 | Example 16 |
|---|---|---|---|
| Seaweed dry matter | | | |
| kg | 12.95 | 13.08 | 15.60 |
| wt % | 16.0 | 16.0 | 18.8 |
| Anhydrous KOH | | | |
| kg | 3.59 | 3.59 | 3.59 |
| wt % | 4.44 | 4.39 | 4.33 |
| Anhydrous NaOH | | | |
| kg | | 0.50 | |
| wt % | | 0.61 | |
| Isopropanol | | | |
| kg | 12.0 | 12.0 | 12.0 |
| wt % | 14.9 | 14.7 | 14.5 |
| Water | | | |
| kg | 52.26 | 52.63 | 51.61 |
| wt % | 64.68 | 64.30 | 62.30 |
| Reaction mixture, total weight, kg | 80.8 | 81.8 | 82.8 |

TABLE 15

Characteristics of the non-extruded products obtained in Examples 14–16.

| | Example 14 | Example 15 | Example 16 |
|---|---|---|---|
| Starch, wt % | 4.1 | 4.9 | 2.1 |
| Cellulose, wt % | <1.0 | <1.0 | <1.0 |
| Nitrogen, wt % | 0.02 | 0.03 | 0.05 |
| Acid insoluble matter, (AIM), wt % | 0.7 | 0.9 | 1.2 |

TABLE 16

Viscosity (expressed in cP) of the products obtained in Examples 14–16 measured in demineralized water at 75° C. and 30 rpm

| | Example 14 | Example 15 | Example 16 |
|---|---|---|---|
| Non-extruded product | 24.8 | 66.0 | 141.0 |
| Extruded product | 18.6 | 68.4 | 150.0 |

Example 17

Dried seaweed material of the species *Iridaea ciliata* and *Gigartina skottsbergii*, respectively, having a dry matter content of about 80 wt % was pre-treated by washing with an aqueous solution containing potassium chloride (10 wt %).

The wet pre-washed seaweed was cut into pieces and treated in a homogeneous basic solvent mixture comprising water, isopropanol and potassium hydroxide at a temperature of 90° C. for 3 hours.

After completion of the heat treatment the solution was drained off and the treated seaweed material was washed three times using 30%, 30% and 35% by weight, respectively, of isopropanol/water mixtures. The treated seaweed material of the species *Gigartina skottsbergii* was in addition to this washed with an aqueous solution of isopropanol (10 wt %) containing potassium chloride (5 wt %).

The washed seaweed material was partly dried to remove the organic solvent giving a product (*G. skottsbergii*) with a dry matter content of 40.0 wt % and a product (*I. ciliata*) with a dry matter content of 32.8 wt %. For purposes of comparison a smaller part of the products were dried to a dry matter content of about 90 wt % (see Table 17) and ground to a particle size of less than 0.180 mm.

The semi-dried products were fed to the same extruder as used in Example 14 and processed under conditions which are shown in Table 17.

After extrusion the products were dried and ground to a powder with a particle size of less than 0.180 mm.

The products obtained produced water gels having a light transmission of %T=18.1 (*G. Skottsbergii*) and 18.3 (*I. Ciliata*), respectively.

The extruded and the non-extruded products were analyzed for starch and glucose. The results are shown in Table 18.

TABLE 17

Operating conditions for shear stress and extrusion treatment in Example 17

|  | Iridaea ciliata | Gigartina skottsbergii |
|---|---|---|
| Temperature of extruder: | | |
| Near the feed inlet: | 88–90° C. | 74–76° C. |
| Central zone: | 123–124° C. | 120–123° C. |
| Near the discharge end: | 133–135° C. | 141–142° C. |
| Internal pressure near the discharge end: | 10–11 bar | 20–21 bar |
| Number of revolutions: | 39 rpm | 96 rpm |
| Torque: | 4–5 Nm | 6–7 Nm |
| Back force: | 0.3–0.4 kN | 0.5–0.6 kN |

TABLE 18

Content of starch and glucose in the products of Example 17

|  | Dry matter wt % | Starch, wt % | Glucose, wt % |
|---|---|---|---|
| *Iridaea ciliata* | | | |
| Extruded product | 93.1 | 2.5 | <0.3 |
| Non-extruded product | 93.0 | 2.5 | <0.3 |
| *Gigartina skottsbergii* | | | |
| Extruded product | 93.8 | 4.3 | <0.3 |
| Non-extruded product | 93.7 | 4.5 | <0.3 |

As seen from Table 18 the content of starch and glucose is unaffected by the shear stress and extrusion treatment.

As seen from Table 16 the ability of carrageenan to impart viscosity to aqueous solutions is preserved in the extruded products indicating that this treatment does not result in any essential degradation of the biopolymer chain.

However, compared to base treated seaweed which has not been subjected to shear stress treatment, the products according to the invention are more swellable and soluble in water. This is discovered when a suspension of the products in water is heated. Using a Brabender Viscograph the viscosity as a function of time and temperature is recorded. The increase of viscosity at first and later on a decrease in viscosity can be directly correlated to hydration/swelling and dissolution of the carrageenan particles.

As seen from Table 19 the extruded products start swelling and come to maximum swelling in a shorter time and at lower temperatures than do the non-extruded products. Further, the degree of swelling is much higher.

TABLE 19

Temperature of hydration/swelling in water of the products obtained in Examples 14–17

|  |  | Temperature (°C.) of swelling | |
|---|---|---|---|
|  |  | onset | maximum |
| Ex. 14: | Non-extruded product | 56 | 68 |
|  | Extruded product | 54 | 60 |
| Ex. 15: | Non-extruded product | 52 | 70 |
|  | Extruded product | 46 | 58 |
| Ex. 16: | Non-extruded product | 49 | 73 |
|  | Extruded product | 48 | 71 |
| Ex. 17: | *Gigartina skottsbergii* | | |

TABLE 19-continued

Temperature of hydration/swelling in water of the products obtained in Examples 14–17

|  | Temperature (°C.) of swelling | |
|---|---|---|
|  | onset | maximum |
| Non-extruded product | 53 | 62 |
| Extruded product | 47 | 52 |

Apparatus: Brabender Viskograph (type 801200); 60 rpm. Temperature program: Heating 1.5° C./min, start 35° C., stop 95° c.

System: 3 wt % of product (Example 14, 16 and 17) and 2 wt % of product (Example 15) suspended in 0.7 wt % aqueous potassium chloride. Total amount: 450 g.

Example of maximum temperatures (°C.) of hydration/swelling for carrageenan products obtained by processes similar to the above-mentioned are:

|  | non-extruded | extruded |
|---|---|---|
| *I. ciliata* | 62 | 68 |
| *I. ciliata* | 62 | 68 |
| *I. ciliata* | 61 | 67 |
| *I. ciliata* | 58 | 62 |
| *G. skottsbergii* | 56 | 64 |
| *G. skottsbergii* | 56 | 61 |
| *E. cottonii* | 77 | 82 |

Examples of values for light transmission are %T=6.6 for *I. ciliata* (large scale production batch), %T=14.5 for *G. skottsbergii* (large scale production batch), and %T=10.3 for *I. ciliata* (laboratory experiment), respectively.

Figure 2:
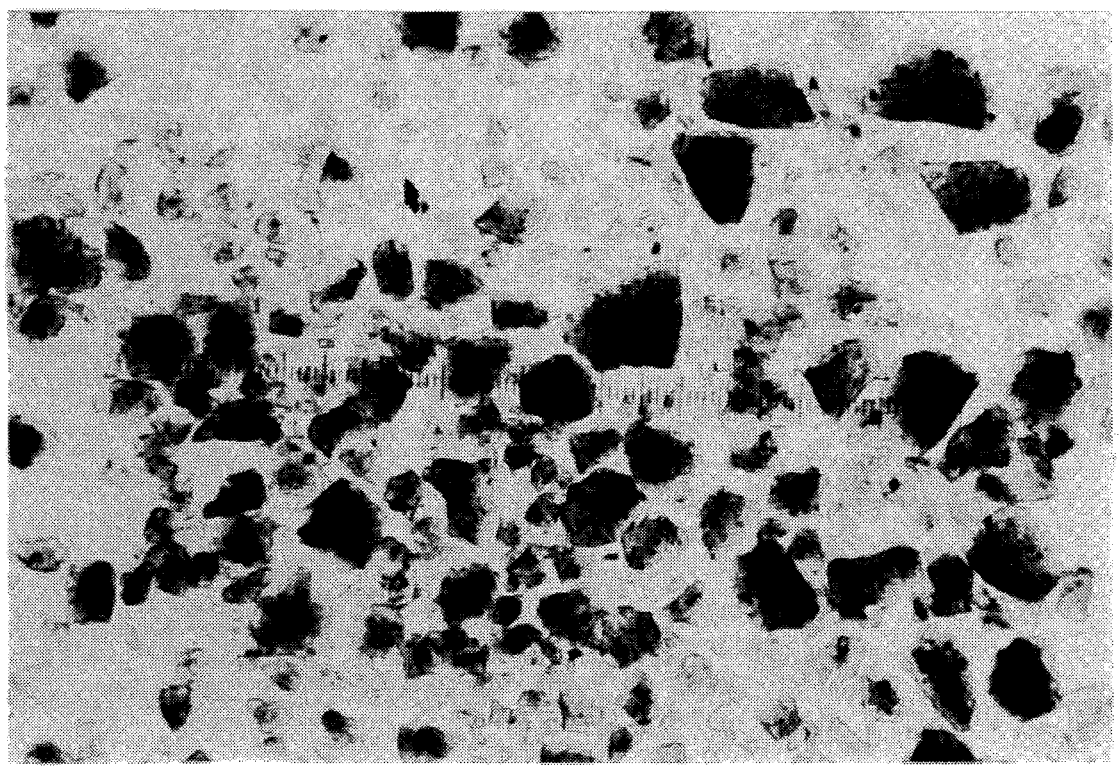
FIG. 2 shows a microscopic presentation of a typical extruded product at a magnification of 250x.
Figure 3:
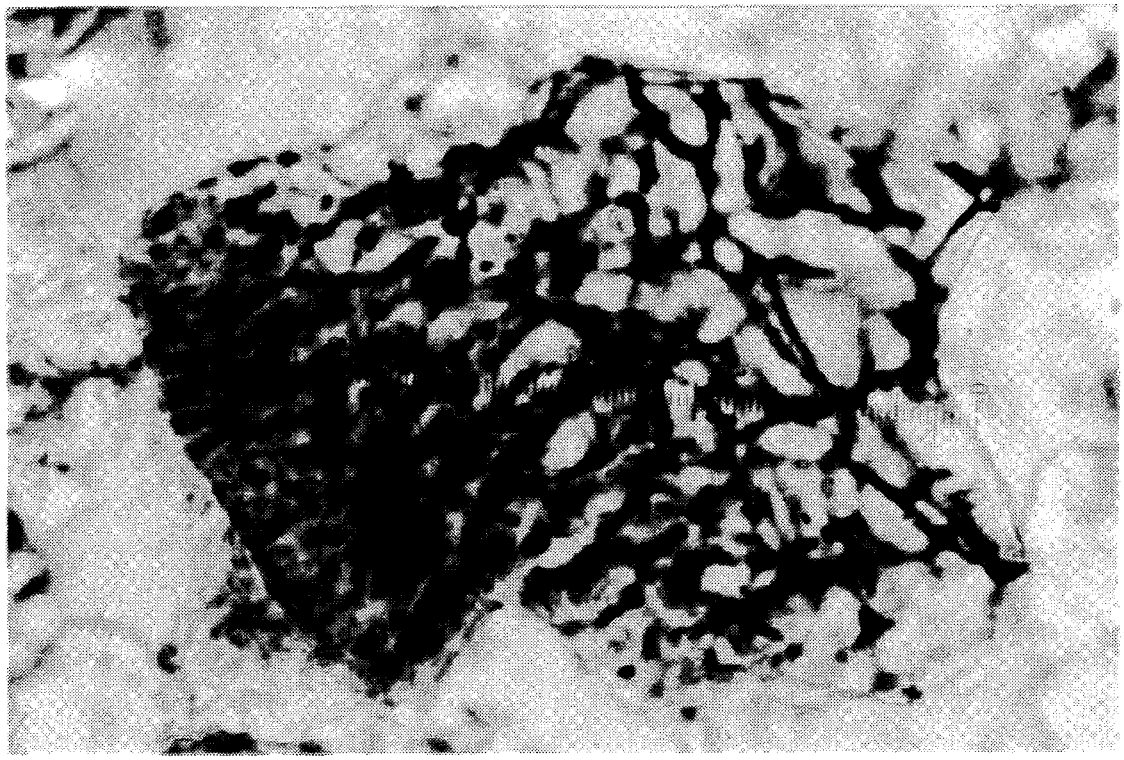
FIG. 3 shows a microscopic presentation of a typical non-extruded product at a magnification of 1000x.
Figure 4:
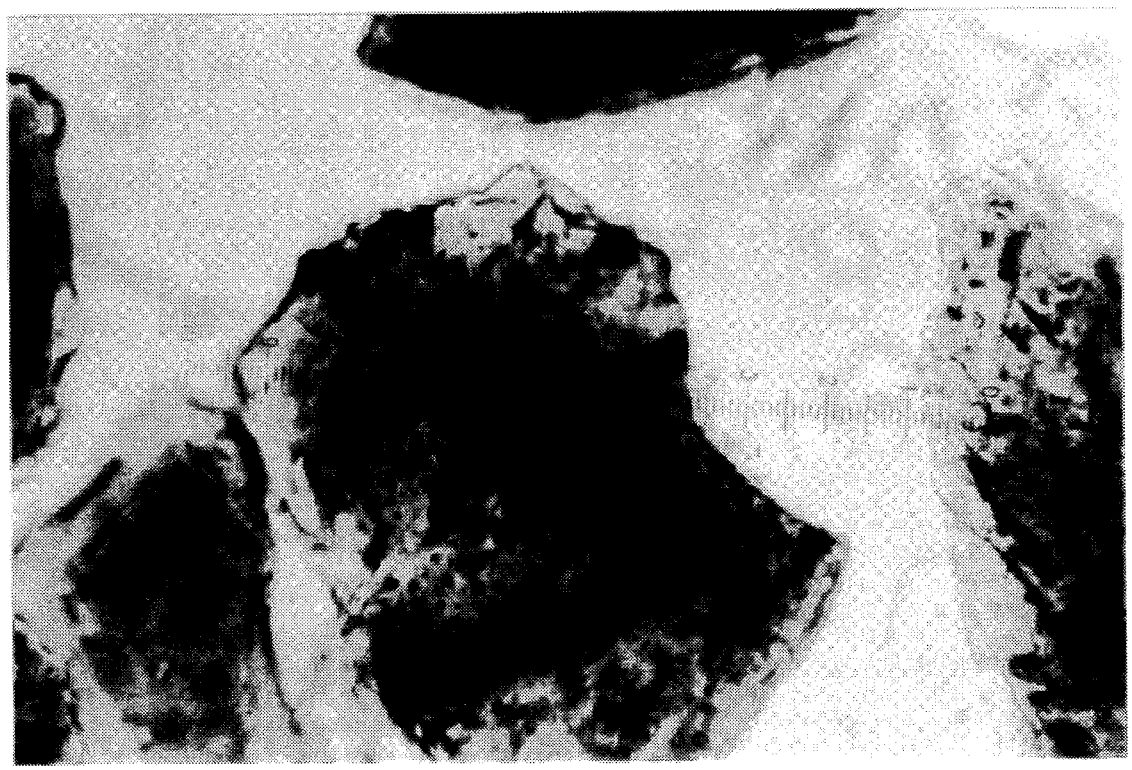
FIG. 4 shows a microscopic presentation of a typical extruded product at a magnification of 1000x.

Dispersed in water and stained with iodine, the powdered products with particle size <0.180 mm showed distinct difference when viewed under a light microscope. In the base treated seaweed material which had not been extruded intact cell structures were clearly observed whereas extruded products only showed cell fragments embedded in particles of rehydrated carrageenan gel (FIGS. 1–4).

I claim:

1. A method of producing a carrageenan product which contains at least 70% by weight of carrageenan, comprising subjecting a carrageenan-containing seaweed material in which 6-sulphated galactose units in the carrageenan have been converted into 3,6-anhydro galactose units by treating said material with a base and which has a dry matter content of at least 25% by weight and at the most 75% by weight to an extrusion or shear mixer treatment to obtain a carrageenan product, which product (i) shows a maximum swelling at a temperature which is at the most 85° C., when measuring a 3% by weight suspension of the product having a dry matter content of at least 85% by weight and an average particle size of less than 0.18 mm, in a 0.7% by weight aqueous solution of KCl by means of a Brabender Viscograph operated at 60 rpm and at a heating rate of 1.5° C./min from an initial temperature of 35° C., and which product (ii) exhibits a light transmission of at least 5% when measured in the form of a water gel containing 0.126% dry matter of the product by means of a spectrophotometer at a wavelength of 420 nm in a cuvette with a light path of 1 cm.

2. A method according to claim 1, wherein the carrageenan product shows a maximum swelling at a temperature which is at the most 75° C., and more preferably at the most 65° C.

3. A method according to claim 1, wherein the carrageenan product exhibits a light transmission of at least 10%.

4. A method according to claim 1, wherein the shear stress treatment is extrusion.

5. A method according to claim 1, wherein the seaweed material is subjected to the shear stress treatment at a temperature in the range of a temperature in the range of 100 to 175° C.

6. A method according to claim 1, wherein the seaweed material subjected to the shear stress treatment comprises at least one added base substance selected from the group consisting of an alkali metal hydroxide, an alkali metal carbonate, an alkaline earth metal hydroxide, an alkaline earth metal carbonate, an alkali metal alcoholate and a basic inorganic phosphate.

7. A method according to claim 1, wherein the shear stress treated seaweed material is subjected to a further process step selected from comminution and drying.

8. A method according to claim 7, wherein the shear stress treated seaweed material is dried to a dry matter content of at least 85% by weight.

9. A carrageenan product containing at least 70% by weight carrageenan, which product
 (i) shows a maximum swelling at a temperature which is at the most 85° C., when measuring a 3% by weight suspension of the product having a dry matter content of at least 85% by weight and an average particle size of less than 0.18 mm, in a 0.7% by weight aqueous solution of KCl by means of a Brabender Viscograph operated at 60 rpm and at a heating rate of 1.5° C./min from an initial temperature of 35° C.;
 (ii) exhibits a light transmission of at least 5%, when measured in the form of a water gel containing 0.126% dry matter of the product by means of a spectrophotometer at a wavelength of 420 nm in a cuvette with a light path of 1 cm; and
 (iii) has a cellulose content of at least 0.5% by weight.

10. A product according to claim 9, which contains at least 75% by weight of carrageenan.

11. A product according to claim 9, which shows a maximum swelling at a temperature which is at the most 75° C.

12. A product according to claim 9, which exhibits a light transmission of at least 10%.

13. A product according to any one of claims 9–12 having a content of dry matter of at least 85% by weight and showing the following characteristics:
 a) a content of acid insoluble matter of at the most 2% by weight;
 b) a cellulose content in the range of 0.5% to 2.0% by weight;
 c) a starch content of at the most 11% by weight.

14. A product according to any one of claims 9–12 having a content of dry matter of at least 85% by weight and showing the following characteristics:
 a) an acid insoluble matter content of at the most 15.0% by weight;
 b) a content of cellulose in the range of 2% to 15.0% by weight;
 c) a starch content of at the most 5% by weight.

15. A method of producing a carrageenan product which contains at least 70% by weight carrageenan, comprising treating a seaweed starting material containing carrageenan in a reaction mixture comprising a substantially homogeneous basic mixture of a solvent in which carrageenan is substantially insoluble, and an aqueous phase comprising a base to convert 6-sulphated galactose units in the carrageenan into 3,6-anhydro galactose units, and separating the thus treated seaweed material from the reaction mixture.

16. A method according to claim 15, wherein the separated, treated seaweed material is subjected to at least one washing step with a solvent/water mixture, wherein the weight ratio between the solvent and water is from 15:85 to 99:1.

17. A method according to claim 15, wherein the seaweed starting material is selected from species of the family Solieriaceae.

18. A method according to claim 17, wherein the seaweed material is an Eucheuma spp.

19. A method according to claim 15, wherein the seaweed starting material is selected from species of the family Gigartinaceae.

20. A method according to claim 19, wherein the seaweed material is a Gigartina spp.

21. A method according to claim 19, wherein the seaweed material is an Iridaea spp.

22. A method according to claim 15, wherein the seaweed starting material is a mixture of material selected from the family Solieriaceae and of material selected from the family Gigartinaceae.

23. A method according to any one of the claims 15–22, wherein the seaweed starting material is in the form of pieces of at the most 5 cm.

24. A method according to any one of the claims 15–22, wherein the reaction mixture has a content of seaweed dry matter which is in the range of 5 to 20% by weight.

25. A method according to any one of the claims 15–22, wherein the seaweed starting material is treated at a temperature in the range of 50° to 150° C.

26. A method according to any one of the claims 15–22, wherein the base is selected from the groups consisting of hydroxides and carbonates of alkali metals, alkaline earth metals and ammonium; alkali metal alcoholates; basic inorganic phosphates; and mixtures thereof.

27. A method according to any one of the claims 15–22, wherein the solvent is selected from the groups consisting of monohydric alcohols, dihydric alcohols, trihydric alcohols, ketones and glycol ethers; and mixtures thereof.

28. A method according to any one of the claims 15–22, wherein the substantially homogeneous basic mixture further contains an added neutral salt selected from the groups consisting of neutral salts of K, Na, Ca, Mg, and Ba; and mixtures thereof.

29. A method according to any one of the preceding claims 15–22, wherein the concentration of base in the reaction mixture is in the range of 0.25 M/kg liquid phase to 3.0 M/kg liquid phase.

30. A method according to any one of the claims 15–22, wherein the weight ratio between solvent and water in the reaction mixture is from 5:95 to 50:50.

31. A method according to claim 16, wherein the washing step is at a temperature of at least 50° C.

32. A method according to claim 16, wherein the solvent in the solvent/water mixture is selected from the groups consisting of monohydric alcohols, dihydric alcohols, trihydric alcohols, ketones and glycol ethers; and mixtures thereof.

33. A method according to claim 16, wherein the solvent/water mixture further contains an added neutral salt selected from the group consisting of salts of K, Na, Ca, Mg and Ba; and mixtures thereof.

34. A method according to claim 16, wherein the weight ratio between solvent and water in a first washing step is from 15:85 to 60:40.

* * * * *